United States Patent
Martinez Bauza et al.

(10) Patent No.: US 9,035,939 B2
(45) Date of Patent: May 19, 2015

(54) 3D VIDEO CONTROL SYSTEM TO ADJUST 3D VIDEO RENDERING BASED ON USER PREFERENCES

(75) Inventors: Judit Martinez Bauza, San Diego, CA (US); Samir S. Soliman, San Diego, CA (US); Soham V. Sheth, San Diego, CA (US); Xun Luo, San Diego, CA (US); Vijayalakshmi R. Raveendran, San Diego, CA (US); PhaniKumar K. Bhamidipati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 12/983,649

(22) Filed: Jan. 3, 2011

(65) Prior Publication Data

US 2012/0084652 A1  Apr. 5, 2012

Related U.S. Application Data

(60) Provisional application No. 61/389,372, filed on Oct. 4, 2010.

(51) Int. Cl.
  *G06T 19/00* (2011.01)
  *H04N 13/00* (2006.01)
  *H04N 13/04* (2006.01)

(52) U.S. Cl.
  CPC ....... *H04N 13/0022* (2013.01); *H04N 13/0007* (2013.01); *H04N 13/0051* (2013.01); *H04N 13/0497* (2013.01)

(58) Field of Classification Search
  USPC .................. 345/419; 348/42, 43, 46; 715/719
  See application file for complete search history.

(56) References Cited

U.S. PATENT DOCUMENTS

| | | |
|---|---|---|
| 6,326,995 B1 | 12/2001 | Palm et al. |
| 7,425,950 B2 | 9/2008 | Ito et al. |
| 7,643,672 B2 | 1/2010 | Era |

(Continued)

FOREIGN PATENT DOCUMENTS

| | | |
|---|---|---|
| CN | 101247530 A | 8/2008 |
| CN | 101651842 A | 2/2010 |

(Continued)

OTHER PUBLICATIONS

Banks et al. "Relative image size, not eye position, determines eyes dominance switches". Published Sep. 2003.*
International Search Report and Written Opinion—PCT/US2011/054803—ISA/EPO—Feb. 1, 2012.

*Primary Examiner* — Kimbinh T Nguyen
(74) *Attorney, Agent, or Firm* — Donald Kordich

(57) ABSTRACT

3D image data can be modified based on user preference data received from a user. The user preference data may be received at a first device and used to adjust 3D image data generated by the first device for presentation by a display device, or the first device may receive the user preference data and transmit it to a display device such that the display device may adjust the 3D image data based on the user preference data. The 3D image data may be adjusted based on user preference data to support presentation of 3D imagery on the display device in a manner desired by a user. 3D user viewing preferences may include an amount of pop-out effect in images, a stereo baseline of images, a depth range of images, a spatial distribution of images, a degree of depth sharpness in images, or specification of a user's dominant eye.

38 Claims, 8 Drawing Sheets

(56) References Cited

U.S. PATENT DOCUMENTS

| | | |
|---|---|---|
| 2005/0025349 A1 | 2/2005 | Crewe |
| 2005/0190180 A1 | 9/2005 | Jin et al. |
| 2007/0024614 A1 | 2/2007 | Tam et al. |
| 2008/0002910 A1 | 1/2008 | Ojima et al. |
| 2008/0240549 A1 | 10/2008 | Koo et al. |
| 2009/0295790 A1 | 12/2009 | Pockett |
| 2010/0039504 A1* | 2/2010 | Takahashi et al. ............... 348/54 |
| 2011/0032329 A1* | 2/2011 | Bauza et al. .................... 348/43 |
| 2011/0032334 A1* | 2/2011 | Raveendran et al. ........... 348/46 |
| 2013/0093849 A1* | 4/2013 | He et al. ......................... 348/43 |

FOREIGN PATENT DOCUMENTS

| | | |
|---|---|---|
| EP | 1968329 A2 | 9/2008 |
| JP | H089421 A | 1/1996 |
| JP | 2003209858 A | 7/2003 |
| JP | 2004221700 A | 8/2004 |
| JP | 2008033897 A | 2/2008 |
| JP | 2008294530 A | 12/2008 |
| KR | 20080088305 A | 10/2008 |
| WO | WO2009061305 A1 | 5/2009 |
| WO | WO2009136207 A1 | 11/2009 |
| WO | WO-2010095081 A1 | 8/2010 |

* cited by examiner

3D VIDEO CONTROL SYSTEM TO ADJUST 3D VIDEO RENDERING BASED ON USER PREFERENCES

This application claims the benefit of U.S. Provisional Application 61/389,372 filed on Oct. 4, 2010, the entire contents of which are incorporated herein by reference.

TECHNICAL FIELD

This disclosure relates to rendering and processing of multimedia data, and in particular, rendering and processing of three-dimensional picture and video data.

BACKGROUND

Computational complexity of stereo video processing is important in rendering of three-dimensional (3D) graphics and, specifically, in visualization of 3D scenes in low-power (i.e., battery-powered) devices, such as mobile phones, mobile media players, Personal Digital Assistant (PDA) devices, and the like. Visualization of 3D scenes may be useful in presentation of some movies, video games, user interfaces, and other 3D graphics applications.

In general, the difficulties in rendering of 3D graphics on a stereo-enabled display (e.g., auto-stereoscopic or stereoscopic display) come from the efficiency and reality aspects of the stereo video processing. Limited computational resources of the low-power devices may cause rendering of 3D graphics to be an excessively time-consuming routine. Despite the considerable efforts devoted to increasing performance of stereo video processing, further improvements would be desirable.

Additionally, the ability to allow users to customize their viewing experiences would also be desirable. The Human Visual System (HVS) perceives depth when two views of the same scene are presented to the left eye and right eye, respectively. Planar 3D displays, either stereoscopic or auto-stereoscopic, rely on providing two different views to the left eye and right eye, respectively, that are consistent with what the eye would perceive when viewing the scene directly. Therefore, points located at different depths in the scene will be shifted differently in the two views. The shift in location is called disparity when it refers to the images or parallax when this location is on the screen.

The parallax for a given point is positive when the location of this point on the screen for the left view is to the left of the location of this point on the screen for the right view. If the location of this point on the screen for the left view is to the right of the location of this point on the screen for the right view, then, the parallax is negative. If the location for both views is the same, the parallax is null. The location in space containing all the points that have zero parallax is known as the convergence plane. Negative parallax provides a pop-out effect whereas positive parallax provides a deep effect (as if seen through a hole or a window).

Given certain viewing conditions such as screen properties and viewing distance, there exists a maximum image disparity for which each individual is able to make their eyes converge. This is called the fusible range. The range of positive and negative disparities is not symmetric and depends on each individual. The perceived retinal disparity of the screen parallax depends on the image disparity, the pitch of the pixels on the screen (related to the size and resolution of the screen) and the viewing distance. Due to variation among in individuals' eyes as well as variances in viewing conditions, the effectiveness of parameters used for rendering optimal 3D content may vary for different viewers.

SUMMARY

This disclosure describes techniques for modifying 3D image data based on user preference data received from a user. In some examples, the user preference data may be received at a first device and used to adjust 3D image data generated by the first device for presentation by a display device. In other examples, the first device may receive the user preference data and transmit it to a display device such that the display device may adjust the 3D image data based on the user preference data. In either case, the 3D image data may be adjusted based on user preference data to support presentation and viewing of 3D imagery on the display device in a manner desired by a user. In some examples, the first device might be a mobile device such as a mobile phone, mobile media player, Personal Digital Assistant (PDA) device, or the like. Examples of 3D user viewing preferences may include an amount of pop-out effect in images, a stereo baseline of images, a depth range of images, a spatial distribution of images, a degree of depth sharpness in images, or specification of a user's dominant eye.

In one example, a system includes a user interface module configured to receive user preference data for presentation of 3D image content; a disparity estimation module configured to store a disparity map based on disparity values associated with the 3D image content; and, a disparity processing module configured to modify the disparity map based on the user preference data.

In another example, a method includes receiving user preference data for presentation of 3D image content; storing a disparity map based on disparity values associated with the 3D image content; modifying the disparity map based on the user preference data; generating 3D video based on the modified disparity map.

In another example, a computer readable storage medium tangibly stores one or more instructions, which when executed by one or more processors cause the one or more processors to: receive user preference data for presentation of 3D image content; store a disparity map based on disparity values associated with the 3D image content; modify the disparity map based on the user preference data; and, generate 3D video based on the modified disparity map.

In another example embodiment, an apparatus includes means for receiving user preference data for presentation of 3D image content; means for storing a disparity map based on disparity values associated with the 3D image content; means for modifying the disparity map based on the user preference data; means for generating 3D video based on the modified disparity map.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

On current 2D displays, picture characteristics such as brightness and sharpness can be adjusted based on user preferences. Current 3D-ready displays, however, typically contain no such mechanism for adjusting the visualization of 3D content. Every individual may have different preferences or requirements regarding the displayed properties of 3D content based on viewing conditions and preferences. This disclosure describes adjusting perceived 3D effects based on user preferences.

Aspects of the present disclosure include techniques for calculating disparity values for two images of a stereo pair of images, where the stereo pair of images includes a first image and a second image of a common scene. The first and second images may throughout this disclosure also be referred to as left and right images, left and right views, or first and second views. The first and second images of the stereo pair can be displayed simultaneously or in rapid succession to create a scene with three-dimensional (3D) objects. Aspects of the present disclosure further include techniques for allowing users to adjust preferences that customize how the 3D content is rendered and ultimately displayed.

The term "disparity" as used in this disclosure generally describes the horizontal offset of a pixel in one image relative to a corresponding pixel in the other image to produce a 3D effect. Corresponding pixels, as used in this disclosure, generally refers to pixels that belong to the same point in the 3D object, but in the different images.

Pixels representative of an object that is relatively close to the focal point of a camera generally have a higher disparity than pixels representative of an object that is relatively far from the camera. More specifically, the screen used to display the images can be considered to be a plane of convergence, such that corresponding pixels with zero disparity are located at the plane of convergence and generally appear to a viewer to be located at the same distance as the plane of convergence. Generally, objects in front of the screen are considered to have negative disparities whereas objects behind the screen are considered to have positive disparity.

A plurality of disparity values for a stereo pair of images can be stored in a data structure referred to as a disparity map. The disparity map associated with the stereo pair of images represents a 2D-function, d(x, y), such that the value of d at any given (x, y) coordinate in a first image corresponds to the shift in the x-coordinate that needs to be applied to a pixel at coordinate (x, y) in the second image to find the corresponding pixel in the second image.

Figure 1:
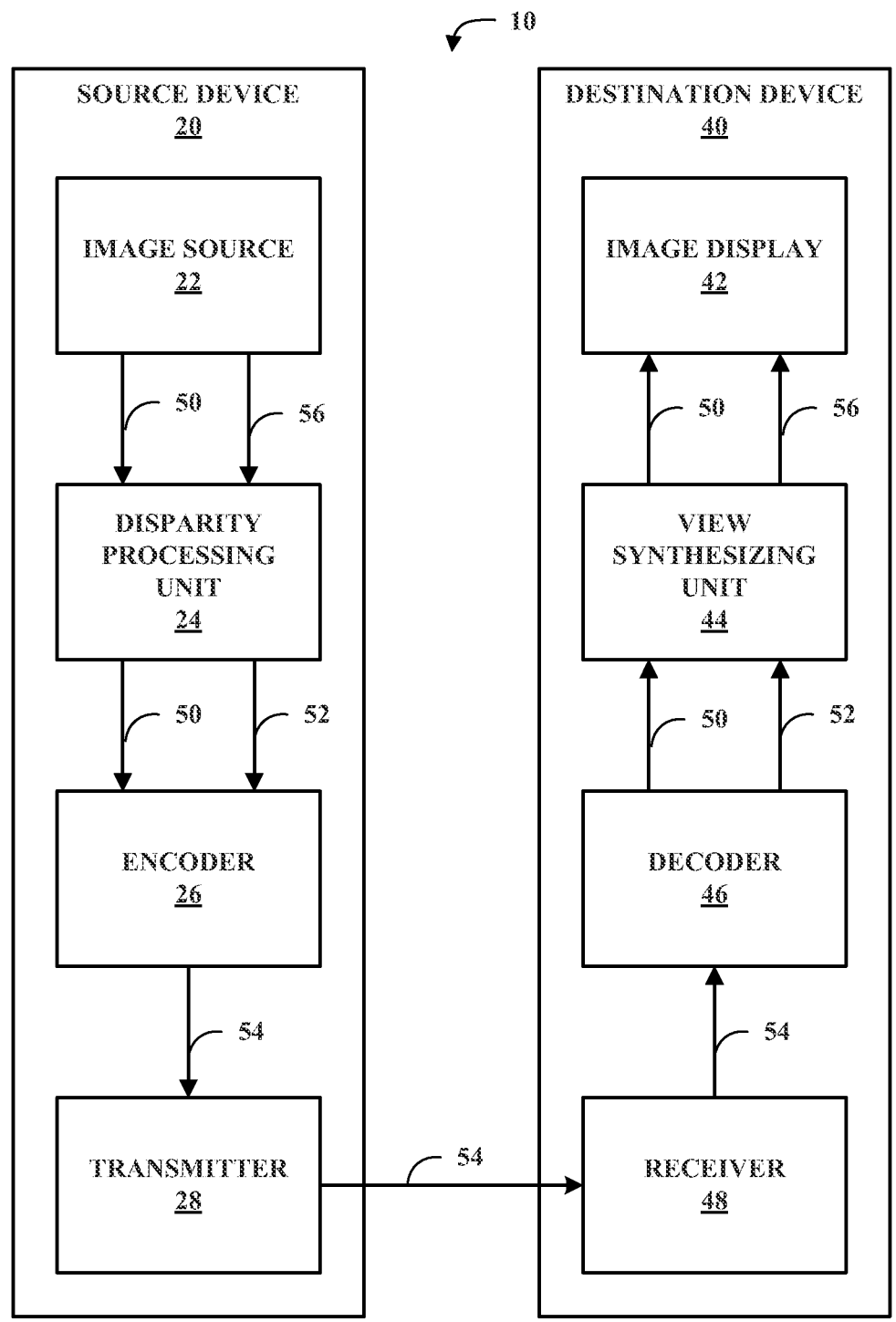
FIG. 1 is a block diagram illustrating an example system in which a source device sends three-dimensional image data to a destination device.

FIG. 1 is a block diagram illustrating an example system 10. As shown in FIG. 1, system 10 may include a source device with image source 22, disparity processing unit 24, encoder 26, and transmitter 28, and may further include a destination device 40 with image display 42, view synthesizing unit 44, decoder 46, and receiver 48. In the example of FIG. 1, destination device 40 receives encoded image data 54 from source device 20. Source device 20 and/or destination device 40 may comprise wireless communication devices, such as wireless handsets, so-called cellular or satellite radiotelephones, or any wireless devices that can communicate picture and/or video information over a communication channel, in which case the communication channel may comprise a wireless communication channel. Destination device 40 may be referred to as a three-dimensional (3D) display device or a 3D rendering device.

Image source 22 provides a stereo pair of images, including first view 50 and second view 56, to disparity processing unit 24. Disparity processing unit 24 uses first view 50 and second view 56 to generate 3D processing information 52. Disparity processing unit 24 transfers the 3D processing information 52 and one of the two views (first view 50 in the example of FIG. 1) to encoder 26, which encodes first view 50 and the 3D processing information 52 to form encoded video data 54. Transmitter 28 transmits encoded video data 54 to destination device 40.

Receiver 48 receives encoded image data 54 from transmitter 28. Decoder 46 decodes the encoded image data 54 to extract a first view 50 and 3D processing information 52. Based on the first view 50 and the 3D processing information 52, view synthesizing unit 44 can reconstruct the second view 56. Based on the first view 50 and the second view 56, image display 42 can render a three-dimensional image. Although not shown in FIG. 1, first view 50 and second view 56 may undergo additional processing at either source device 20 or destination device 40. Therefore, in some examples, the first view 50 that is received by view synthesizing unit 44 or the first view 50 and second view 56 that are received by image display 42 may actually be modified versions of the first view 50 and second view 56 received from image source 56. The 3D processing information 52 may, for example, comprise a disparity map or depth information based on a disparity map.

Various techniques exist for determining depth information based on disparity information, and vice versa. Thus, whenever the present disclosure discusses encoding, decoding, processing, or transmitting disparity information, it is also contemplated that depth information based on the disparity information might be encoded, decoded, processed, or transmitted instead.

Aspects of this disclosure are not necessarily limited to wireless applications or settings. For example, aspects of this disclosure may be applied to over-the-air television broadcasts, cable television transmissions, satellite television transmissions, Internet video transmissions, encoded digital video that is encoded onto a storage medium, or other scenarios. Accordingly, the communication channel may comprise any combination of wireless or wired media suitable for transmission of encoded video and/or picture data. As one example, when using a pinhole camera model and a parallel stereo setup, a depth value (Z) can be determined based on a disparity value (d) in accordance with the following equation:

$$Z = bf/d \quad (1)$$

where b is the baseline (i.e. the distance between the two camera centers of the pinhole camera model), and f is the focal length of the pinhole camera model.

Image source 22 may comprise an image sensor array, e.g., a digital still picture camera or digital video camera, a computer-readable storage medium comprising one or more stored images, an interface for receiving digital images from an external source, a processing unit that generates digital images such as by executing a video game or other interactive multimedia source, or other sources of image data. Image source 22 may generally correspond to a source of any one or more of captured, pre-captured, and/or computer-generated images. In some examples, image source 22 may correspond to a camera of a cellular (i.e., mobile) telephone. In general, references to images in this disclosure include both still pictures as well as frames of video data. Thus, the techniques of this disclosure may apply both to still digital pictures as well as frames of captured digital video data or computer-generated digital video data.

Image source 22 provides image data for a stereo pair of images 50 and 56 to disparity processing unit 24 for calculation of disparity values between the images. The stereo pair of images 50 and 56 comprises a first view 50 and a second view 56. Disparity processing unit 24 may be configured to automatically calculate disparity values for the stereo pair of images 50 and 56, which in turn can be used to calculate depth values for objects in 3D image. For example, image source 22 may capture two views of a scene at different perspectives, and then calculate depth information for objects in the scene based on a determined disparity map. In various examples, image source 22 may comprise a standard two-dimensional camera, a two camera system that provides a stereoscopic view of a scene, a camera array that captures multiple views of the scene, or a camera that captures one view plus depth information.

Although image source 22 may provide multiple views (i.e. first view 50 and second view 56), disparity processing unit 24 may calculate disparity values based on the multiple views, and source device 20 may transmit only a first view 50 plus 3D processing information 52 (i.e. the disparity map or depth information for each pair of views of a scene determined from the disparity map). For example, image source 22 may comprise an eight camera array, intended to produce four pairs of views of a scene to be viewed from different angles. Source device 20 may calculate disparity information or depth information for each pair and transmit only one image of each pair plus the disparity information or depth information for the pair to destination device 40. Thus, rather than transmitting eight views, source device 20 may transmit four views plus depth/disparity information for each of the four views in the form of encoded image data 54, in this example. In some examples, disparity processing unit 24 may receive disparity information for an image from a user or from another external device.

Disparity processing unit 24 passes first view 50 and 3D processing information 52 to encoder 26. 3D processing information 52 may comprise a disparity map for a stereo pair of images 50 and 56. When first view 50 is a digital still picture, encoder 26 may be configured to encode the first view 50 as, for example, a Joint Photographic Experts Group (JPEG) image. When first view 50 is a frame of video data, encoder 26 may be configured to encode first view 50 according to a video coding standard such as, for example Motion Picture Experts Group (MPEG), MPEG-2, International Telecommunication Union (ITU) H.263, ITU-T H.264/MPEG-4, H.264 Advanced Video Coding (AVC), ITU-T H.265, or other video encoding standards. Encoder 26 may include in encoded image data 54, 3D processing information 52 along with the encoded image for the first view 50. Encoder 26 passes encoded image data 54 to transmitter 28.

In some examples, a depth map can be estimated. When more than one view is present, stereo matching may be used to estimate depth maps when more than one view is available. However, in 2D to 3D conversion, estimating depth may be more difficult. Nevertheless, a depth map estimated by various methods may be used for 3D rendering based on Depth-Image-Based Rendering (DIBR).

The ITU-T H.264/MPEG-4 (AVC) standard, for example, was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Disparity processing unit 24 may generate 3D processing information 52 in the form of a disparity map. Encoder 26 may be configured to encode the disparity map as part of 3D content transmitted in a bitstream as encoded image data 54. This process can produce one disparity map for the one captured view or disparity maps for several transmitted views. Encoder 26 may receive one or more views and the disparity maps, and code them with video coding standards like H.264/AVC, MVC, which can jointly code multiple views, or scalable video coding (SVC), which can jointly code depth and texture.

When first view 50 corresponds to a frame of video data, encoder 26 may encode first view 50 in an intra-prediction mode or an inter-prediction mode. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value that may be greater than 16. The pixels in a block may be arranged in rows and columns. Blocks may also be N×M, where N and M are integers that are not necessarily equal.

Block sizes that are less than 16 by 16 may be referred to as partitions of a 16 by 16 macroblock. Likewise, for an N×N block, block sizes less than N×N may be referred to as partitions of the N×N block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered to be video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence or superframe, or another independently decodable unit defined according to applicable coding techniques.

In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units.

As noted above, image source 22 may provide two views of the same scene to disparity processing unit 24 for the purpose of generating 3D processing information 52. In such examples, encoder 26 may encode only one of the views along with the 3D processing information 56. In general, source device 20 can be configured to send a first image 50 along with 3D processing information 52 to a destination device, such as destination device 40. Sending only one image along with a disparity map or depth map may reduce bandwidth consumption and/or reduce storage space usage that may otherwise result from sending two encoded views of a scene for producing a 3D image.

Transmitter 28 may send a bitstream including encoded image data 54 to receiver 48 of destination device 40. For example, transmitter 28 may encapsulate encoded image data 54 using transport level encapsulation techniques, e.g., MPEG-2 Systems techniques. Transmitter 28 may comprise, for example, a network interface, a wireless network interface, a radio frequency transmitter, a transmitter/receiver (transceiver), or other transmission unit. In other examples, source device 20 may be configured to store encoded image data 54 in a physical medium such as, for example, an optical storage medium such as a compact disc, a digital video disc, a Blu-Ray disc, flash memory, magnetic media, or other storage media. In such examples, the storage media may be physically transported to the location of destination device 40 and read by an appropriate interface unit for retrieving the data. In some examples, bitstream 54 may be modulated by a modulator/demodulator (MODEM) before being transmitted by transmitter 28.

After receiving encoded image data 54 and decapsulating the data, and in some examples, receiver 48 may provide encoded image data 54 to decoder 46 (or to a MODEM that demodulates the bitstream, in some examples). Decoder 46 decodes encoded image data 54 to extract first view 50 and 3D-processing information 52 from the received bitstream. For example, decoder 46 may recreate first view 50 and a disparity map for first view 50 from the 3D processing information 52. After decoding of the disparity maps, a view synthesis algorithm can generate the texture for other views that have not been transmitted. Decoder 46 may also send first view 50 and 3D processing information 52 to view synthesizing unit 44. View synthesizing unit 44 recreates the second view 56 based on the first view 50 and 3D processing information 52.

In general, the human visual system (HVS) perceives depth based on an angle of convergence to an object. Objects relatively nearer to the viewer are perceived as closer to the viewer due to the viewer's eyes converging on the object at a greater angle than objects that are relatively further from the viewer. To simulate three dimensions in multimedia such as pictures and video, two images are displayed to a viewer, one image for each of the viewer's eyes. Objects that are located at the same spatial location within the image will be generally perceived as being at the same depth as the screen on which the images are being displayed.

To create the illusion of depth, objects may be shown at slightly different positions in each of the images along the horizontal axis. The difference between the locations of the objects in the two images is referred to as disparity. In general, to make an object appear closer to the viewer, relative to the screen, a negative disparity value may be used, whereas to make an object appear further from the user relative to the screen, a positive disparity value may be used. Pixels with positive or negative disparity may, in some examples, be displayed with more or less resolution to increase or decrease sharpness or blurriness to further create the effect of positive or negative depth from a focal point.

View synthesis can be regarded as a sampling problem which uses densely sampled views to generate a view in an arbitrary view angle. However, in practical applications, the storage or transmission bandwidth required by the densely sampled views may be large. Hence, research has been performed with respect to view synthesis based on sparsely sampled views and their depth maps. Although differentiated in details, those algorithms based on sparsely sampled views are mostly based on 3D warping. In 3D warping, given the depth and the camera model, a pixel of a reference view may be first back-projected from the 2D camera coordinate to a point P in the world coordinates. The point P may then be projected to the destination view (the virtual view to be generated). The two pixels corresponding to different projections of the same object in world coordinates may have the same color intensities.

View synthesizing unit 44 may be configured to calculate disparity values for objects (e.g., pixels, blocks, groups of pixels, or groups of blocks) of an image based on depth values for the objects or may receive disparity values encoded in the encoded image data 54. View synthesizing unit 44 may use the disparity values to produce a second view 56 from the first view 50 that creates a three-dimensional effect when a viewer views first view 50 with one eye and second view 56 with the other eye. View synthesizing unit 44 may pass first view 50 and second view 56 to image display 42 for display to a user.

Image display 42 may comprise a stereoscopic display or an autostereoscopic display. In general, stereoscopic displays simulate three-dimensions by displaying two images while a viewer wears a head mounted unit, such as goggles or glasses, that direct one image into one eye and a second image into the other eye. In some examples, each image is displayed simultaneously, e.g., with the use of polarized glasses or colorfiltering glasses. In some examples, the images are alternated rapidly, and the glasses or goggles rapidly alternate shuttering, in synchronization with the display, to cause the correct image to be shown to only the corresponding eye. Auto-stereoscopic displays do not use glasses but instead may direct the correct images into the viewer's corresponding eyes. For example, auto-stereoscopic displays may be equipped with cameras to determine where a viewer's eyes are located and mechanical and/or electronic means for directing the images to the viewer's eyes.

View synthesizing unit 44 may be configured with depth values for behind the screen, at the screen, and in front of the screen, relative to a viewer. View synthesizing unit 44 may be configured with functions that map the depth of objects represented in image data of bitstream 54 to disparity values. Accordingly, view synthesizing unit 44 may execute one of the functions to calculate disparity values for the objects. After calculating disparity values for objects of first view 50 based on 3d processing information 52, view synthesizing unit 44 may produce second view 56 from first view 50 and the disparity values.

View synthesizing unit 44 may be configured with maximum disparity values for displaying objects at maximum depths in front of or behind the screen. In this manner, view synthesizing unit 44 may be configured with disparity ranges between zero and maximum positive and negative disparity values. The viewer may adjust the configurations to modify the maximum depths in front of or behind the screen objects are displayed by destination device 44. For example, destination device 40 may be in communication with a remote control device or other control unit that the viewer may manipulate. The remote control device may comprise a user interface that allows the viewer to control the maximum depth in front of the screen and the maximum depth behind the screen at which to display objects. In this manner, the viewer may be capable of adjusting configuration parameters for image display 42 in order to improve the viewing experience.

By being configured with maximum disparity values for objects to be displayed in front of the screen and behind the screen, view synthesizing unit 44 may be able to calculate disparity values based on 3D processing information 52 using relatively simple calculations. For example, view synthesizing unit 44 may be configured with functions that map depth values to disparity values. The functions may comprise linear relationships between the depth and one disparity value within the corresponding disparity range, such that pixels with a depth value in the convergence depth interval are mapped to a disparity value of zero while objects at maximum depth in front of the screen are mapped to a minimum (negative) disparity value, thus shown as in front of the screen, and objects at maximum depth, thus shown as behind the screen, are mapped to maximum (positive) disparity values for behind the screen.

In one example for real-world coordinates, a depth range might be, e.g., [200, 1000] and the convergence depth distance can be, e.g., around 400, as measured in millimeters for example. Then the maximum depth in front of the screen corresponds to 200 and the maximum depth behind the screen is 1000 and the convergence depth interval can be, e.g., [395, 405]. However, depth values in the real-world coordinate system might not be available or might be quantized to a smaller dynamic range, which may be, for example, an eight-bit value (ranging from 0 to 255). In some examples, such quantized depth values with a value from 0 to 255 may be used in scenarios when the depth map is to be stored or transmitted or when the depth map is estimated. A typical depth-image based rendering (DIBR) process may include converting low dynamic range quantized depth map to a map in the real-world depth map, before the disparity is calculated. Note that, in some techniques, a smaller quantized depth value corresponds to a larger depth value in the real-world coordination. In the techniques of this disclosure, however, it may not be necessary to do this conversion; thus, it may not be necessary to know the depth range in the real-world coordination or the conversion function from a quantized depth value to the depth value in the real-world coordination. Considering an example disparity range of $[-dis_n, dis_p]$, when the quantized depth range includes values from $d_{min}$ (which may be 0) to $d_{max}$ (which may be 255), a depth value $d_{min}$ is mapped to $dis_p$ and a depth value of $d_{max}$ (which may be 255) is mapped to $-dis_n$. Note that $dis_n$ is positive in this example. Assume that the convergence depth map interval is $[d_0-\delta, d_0+\delta]$, then a depth value in this interval is mapped to a disparity of 0. In general, in this disclosure, the phrase "depth value" refers to the value in the lower dynamic range of $[d_{min}, d_{max}]$. The $\delta$ value may be referred to as a tolerance value, and need not be the same in each direction. That is, $d_0$ may be modified by a first tolerance value $\delta_1$ and a second, potentially different, tolerance value $\delta_2$, such that $[d_0-\delta_2, d_0+\delta_1]$ may represent a range of depth values that may all be mapped to a disparity value of zero.

Figure 2:
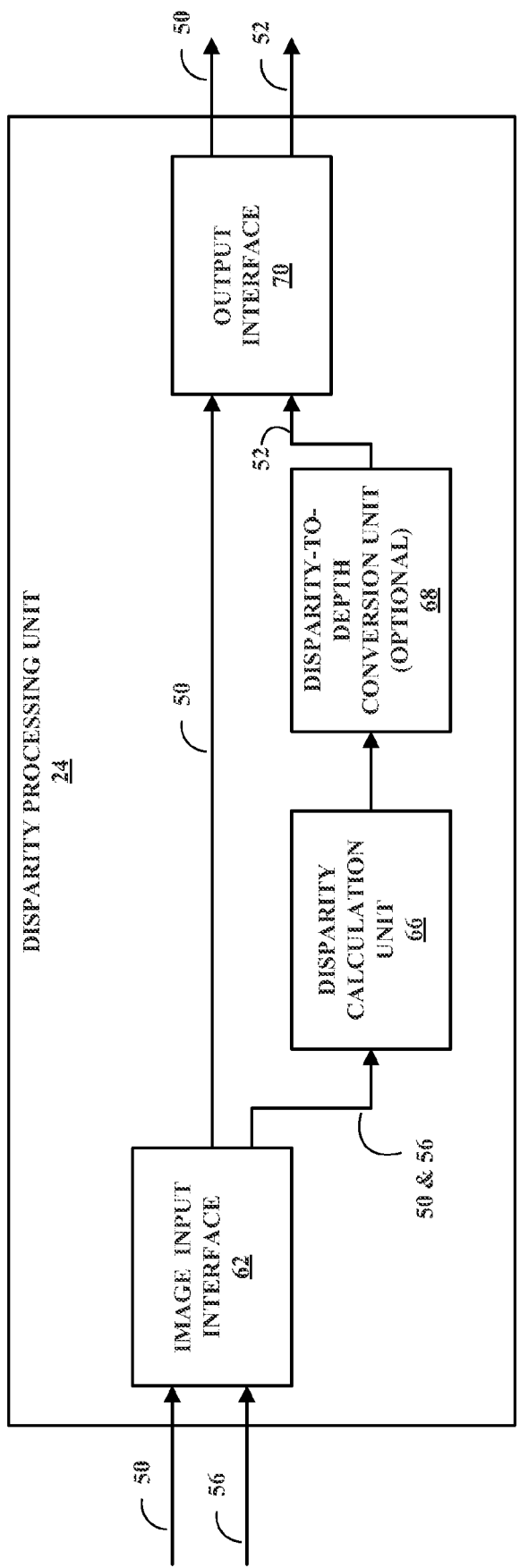
FIG. 2 is a block diagram illustrating an example arrangement of components of a disparity processing unit.

FIG. 2 is a block diagram illustrating an example arrangement of components of disparity processing unit 24. Disparity processing unit 24 may be implemented in hardware, software, firmware, or any combination thereof. When implemented in software and/or firmware, destination device 20 may include hardware for executing the software, such as, for example, one or more processors or processing units. Any or all of the components of disparity processing unit 24 may be functionally integrated.

In the example of FIG. 2, disparity processing unit 24 includes an image input interface 62 for receiving a stereo pair of images 50 and 56 comprising a first view 50 and a second view 56 from an image source. Disparity calculation unit 66 may calculate disparity values for pixels of the stereo image pair consisting of first view 50 and second view 56 and may store the disparity values as a disparity map. The disparity map may optionally be converted to a depth map by a disparity-to-depth conversion unit 68. An output interface 70 can be configured to output the first view 50 of the stereo pair 50 and 56 and the 3D processing information 52 comprising either a disparity map or a depth map to an encoder 26.

Although the examples of FIGS. 1 and 2 generally discuss the techniques of the present disclosure being implemented by disparity processing unit 24 at source device 20, a disparity processing unit functionally equivalent to disparity processing unit 24 may be located at destination device 40 or in a third-party device separate from source device 20 and destination device 40. In an example of an alternative configuration of FIG. 1, source device 20 might transmit encoded image data 54 that includes first view 50 and second view 56 to destination device 40, and a disparity processing unit functionally equivalent to disparity processing unit 24 might calculate 3D processing information 52 at destination device 40. Destination device 40 may use the 3D processing information for purposes such as image refinement or adjusting user preferences.

Figure 3A:
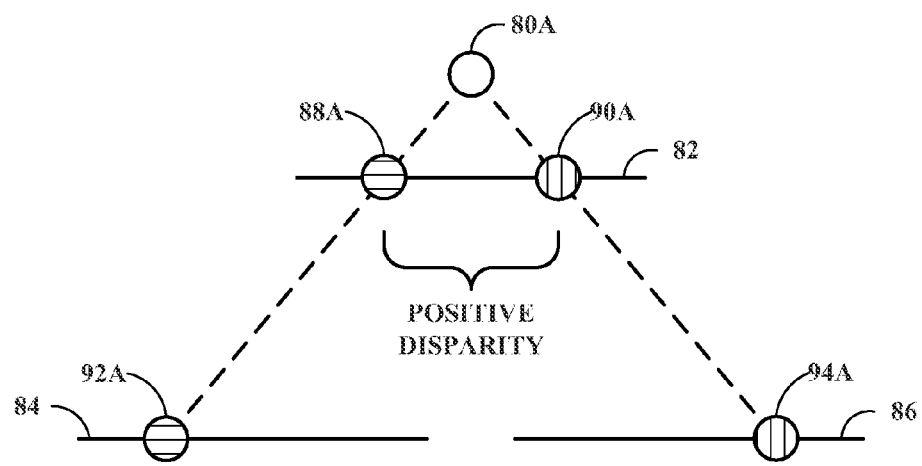
FIGS. 3A-3C are conceptual diagrams illustrating examples of positive, zero, and negative disparity values, respectively, based on depths of pixels.
Figure 3B:
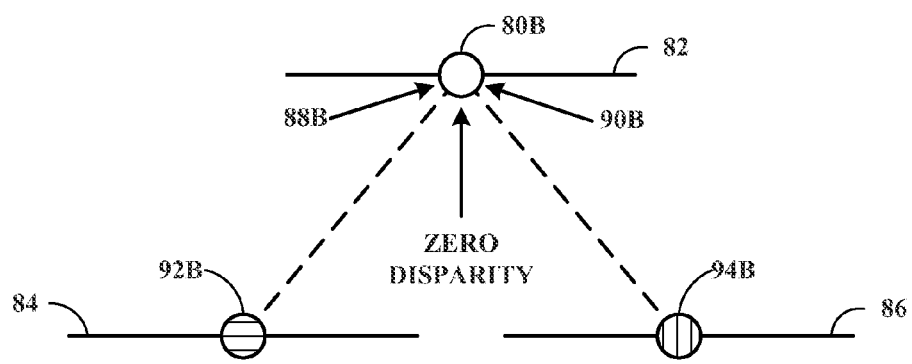
Figure 3C:
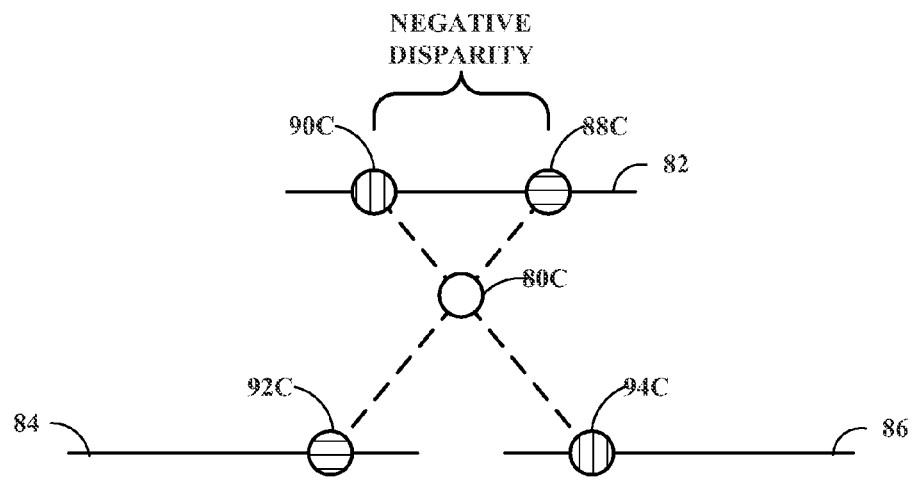

FIGS. 3A-3C are conceptual diagrams illustrating examples of positive, zero, and negative disparity values based on depths of pixels. In general, to create a three-dimensional effect, two images are shown, e.g., on a screen, and pixels of objects that are to be displayed either in front of or behind the screen have positive or negative disparity values respectively, while objects to be displayed at the depth of the screen have disparity values of zero. In some examples, e.g., when a user wears head-mounted goggles, the depth of the "screen" may instead correspond to a common depth $d_0$.

The examples of FIGS. 3A-3C illustrate examples in which screen 82 displays left image 84 and right image 86, either simultaneously or in rapid succession. FIG. 3A illustrates an example for depicting pixel 80A as occurring behind (or inside) screen 82. In the example of FIG. 3A, screen 82 displays left image pixel 88A and right image pixel 90A, where left image pixel 88A and right image pixel 90A generally correspond to the same object and thus may have similar or identical pixel values. In some examples, luminance and chrominance values for left image pixel 88A and right image pixel 90A may differ slightly to further enhance the three-dimensional viewing experience, e.g., to account for slight variations in illumination or color differences that may occur when viewing an object from slightly different angles.

The position of left image pixel 88A occurs to the left of right image pixel 90A when displayed by screen 82, in this example. That is, there is positive disparity between left image pixel 88A and right image pixel 90A. Assuming the disparity value is d, and that left image pixel 92A occurs at horizontal position x in left image 84, where left image pixel 92A corresponds to left image pixel 88A, right image pixel 94A occurs in right image 86 at horizontal position x+d, where right image pixel 94A corresponds to right image pixel 90A. This positive disparity may cause a viewer's eyes to converge at a point relatively behind screen 82 when the user's left eye focuses on left image pixel 88A and the user's right eye focuses on right image pixel 90A, creating the illusion that pixel 80A appears behind screen 82.

Left image 84 may correspond to first image 50 as illustrated in FIGS. 1 and 2. In other examples, right image 86 may correspond to first image 50. In order to calculate the positive disparity value in the example of FIG. 3A, view synthesizing unit 44 may receive left image 84 and a depth value for left image pixel 92A that indicates a depth position of left image pixel 92A behind screen 82. View synthesizing unit 44 may copy left image 84 to form right image 86 and change the value of right image pixel 94A to match or resemble the value of left image pixel 92A. That is, right image pixel 94A may have the same or similar luminance and/or chrominance values as left image pixel 92A. Thus screen 82, which may correspond to image display 42, may display left image pixel 88A and right image pixel 90A at substantially the same time, or in rapid succession, to create the effect that pixel 80A occurs behind screen 82.

FIG. 3B illustrates an example for depicting pixel 80B at the depth of screen 82. In the example of FIG. 3B, screen 82 displays left image pixel 88B and right image pixel 90B in the same position. That is, there is zero disparity between left image pixel 88B and right image pixel 90B, in this example. Assuming left image pixel 92B (which corresponds to left image pixel 88B as displayed by screen 82) in left image 84 occurs at horizontal position x, right image pixel 94B (which corresponds to right image pixel 90B as displayed by screen 82) also occurs at horizontal position x in right image 86.

View synthesizing unit 44 may determine that the depth value for left image pixel 92B is at a depth $d_0$ equivalent to the depth of screen 82 or within a small distance δ from the depth of screen 82. Accordingly, view synthesizing unit 44 may assign left image pixel 92B a disparity value of zero. When constructing right image 86 from left image 84 and the disparity values, view synthesizing unit 44 may leave the value of right image pixel 94B the same as left image pixel 92B.

FIG. 3C illustrates an example for depicting pixel 80C in front of screen 82. In the example of FIG. 3C, screen 82 displays left image pixel 88C to the right of right image pixel 90C. That is, there is a negative disparity between left image pixel 88C and right image pixel 90C, in this example. Accordingly, a user's eyes may converge at a position in front of screen 82, which may create the illusion that pixel 80C appears in front of screen 82.

View synthesizing unit 44 may determine that the depth value for left image pixel 92C is at a depth that is in front of screen 82. Therefore, view synthesizing unit 44 may execute a function that maps the depth of left image pixel 92C to a negative disparity value −d. View synthesizing unit 44 may then construct right image 86 based on left image 84 and the negative disparity value. For example, when constructing right image 86, assuming left image pixel 92C has a horizontal position of x, view synthesizing unit 44 may change the value of the pixel at horizontal position x−d (that is, right image pixel 94C) in right image 86 to the value of left image pixel 92C.

Aspects of this disclosure include allowing a user to adjust user preferences to produce user-customized 3D video. Through a user interface, users can enter values indicating a user preference. Based on the user-entered value, user preference data can be generated, and the user preference data can be used to modify a parameter defining an effect. An example of the type of preference the user is able to control includes selecting an amount of pop-out effect. The amount of pop-out effect is related to the location of the convergence plane with respect to the total depth range. The closer the convergence plane to the minimum depth (assuming that depth values increase towards the viewer location), the more pop-out effect can be perceived. Another example of a user preference is selecting the baseline. The baseline refers to the separation between the two camera centers (assuming a pinhole camera model). The baseline is related to the human eyes' separation, which is different for different individuals (e.g., children have a smaller separation).

Another example of a user preference is selecting the depth range, which is related to the maximum positive and negative parallax to be displayed. Another example of a user preference is selecting the depth distribution mode. Given a maximum depth range selected by the user, the adjustment of the real depth range in the scene can be mapped linearly or following a different distribution, such as logarithmic, exponential or truncated linear, or any other function. Not only the depth range distribution but also the spatial depth distribution can be modified, for example to create an average concave surface depth distribution, or a convex distribution, or any other spatial distribution function.

Another example of a user preference is selecting the degree of sharpness in depth discontinuity. The depth map or disparity map can be processed in such a way that depth discontinuities can be smoothed or sharpened according to user preferences. Another example of a user preference is selecting the eye dominance. Depending on the dominant eye of a user, the synthesized image can be rendered on the left or on the right of the original image. It is often desirable to keep the original image for the dominant eye.

The granularity in the control function used to adjust user preferences can be based on a scale of values. From a minimum to a maximum value for any given parameter, the user can select a desired value. For example, a user may be able to enter a value between one and ten, one and twenty, or any other desired scale, where the value indicates the amount of pop-out effect the user desires, with one indicating less pop out effect and a higher number indicating more pop-out effect. Based on the user-entered value, a pop-out effect parameter can be modified. In the case of specifying a dominant eye, for example, the user can either specify left or right. If the user specifies right, then a dominant eye parameter can be set to right, or if the user specifies left, a dominant eye parameter can be set to left. Based on the setting of the dominant eye parameter, either the first view or second view along with the disparity processing information will be used to render the 3D video.

The selection can also be based on a mode selection, where any given number of adjustable parameters and particular values are assigned to a particular mode. For example, mode 1 might specify user-entered values for a group of five parameters, while mode 2 specifies different values for those five parameters. The different modes can either be saved based on previously entered user preference data, or can be pre-programmed based on commonly desired values for parameters or values for parameters believed to result in high quality video when used in conjunction with one another. The user adjustments can also apply to multi-view displays. In this particular case, each view can be adjusted separately, which is of particular benefit in multi-user viewing conditions. In such a case, each user can control the viewing conditions of its particular view.

Figure 4:
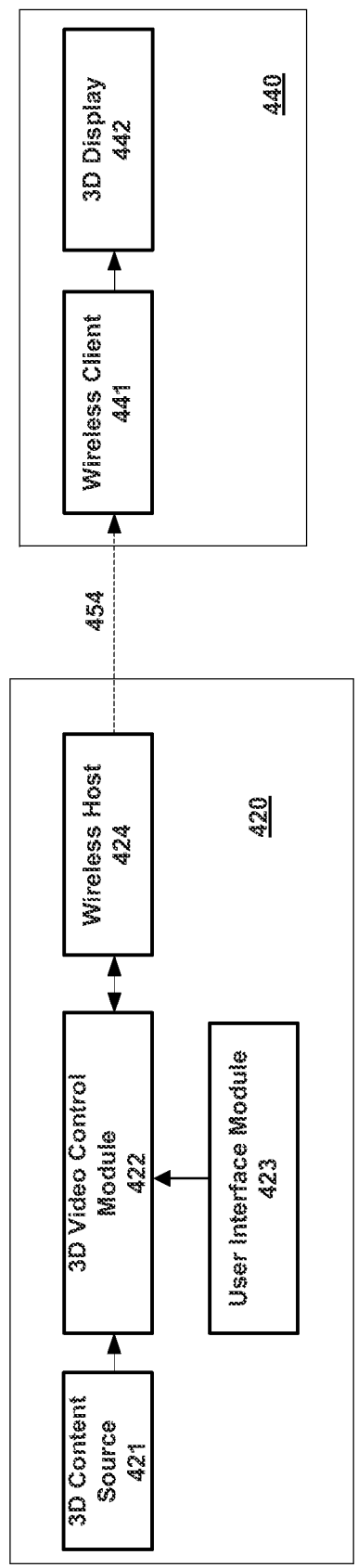
FIG. 4 shows a block diagram of an example system configured to adjust perceived 3D effects based on user preferences, in accordance with an example of the present disclosure.

FIG. 4 shows an example system configured to adjust perceived 3D effects based on user preference data, in accordance with the present disclosure. As will be described in more detail below, the various components shown in FIG. 4 can be distributed throughout source device 20 and destination device 40 of FIG. 1, or may be in external devices not shown in FIG. 1. In the example system shown in FIG. 4 the components of device 420 might be in a device such as source device 20 of FIG. 1 while the components of device 440 might be in a device such as destination device 40 of FIG. 1. The system of FIG. 4 includes a 3D content source 421 that provides 3D content (in particular, stereo content) to a 3D video control module 422. This content can be stored locally as a file, streamed from a source external to the device, or be provided by a multi-view image/video camera embedded in the device or otherwise connected to the device.

FIG. 4 further includes a 3D user interface module 423 configured to capture and process the input of users. The capture can be based on any of a variety of user input media, such as haptic, visual, or audio media. For example, a user may specify a specific numeral value through a graphical user interface (GUI), hard key interface, drop down menu, dial, or other interface. The numerical value entered by the user can specify a value for a user preference parameter or a modification to a user preference parameter. Through a graphical user interface (GUI), hard key interface, drop down menu, dial, or other interface a user may also specify that the value for a user preference parameter be incremented or decremented by a certain amount. In some example systems, 3D user interface module can be a voice-activated interface that responds to voice commands or a motion-activated interface configured to detect motion. The result of processing the input command is communicated as user preference data to 3D video control module 422. Based on the user preference data, 3D video control module 422 can adjust 3D viewing preferences either during the initialization of a viewing session or while the content is being displayed. In one configuration, 3D video control module 422 can process the user preference data from 3D user interface module 423 in real time.

The example system of FIG. 4 further includes a wireless host 424 configured to interface with the components of block 440 via a wireless channel 454. Wireless host 424 receives 3D content, modified based on user preference data, from the 3D video control module 422 and transmits the modified 3D content to a wireless client 441 of device 440 according to a transport protocol, such as WiFi or any other transport protocol known in the art. In one particular embodiment, the user preference data can also be transmitted with the modified 3D content and separately processed by a 3D video control module at device 440.

A 3D display 442 at device 440 can receive the 3D content through wireless client 441. Wireless client 441 may be embedded in 3D display 442 or external to 3D display 442 and connected through an interface, such as an HDMI or Display Port interface. In one particular aspect, certain functionality of 3D video control module 422 may also be embedded in 3D display 442.

In one example system, the functionality of device 420 can be contained within a cellular phone, smartphone, notebook computer, tablet computer, mobile media player, or any wireless devices that can communicate picture and/or video information over a communication channel. The functionality of device 440 can be contained either within a 3D-enabled television or within a set-top box connected to a 3D-enabled television. Additionally, although the example of FIG. 4 is described with a wireless communication channel, it is contemplated that in some configurations, communication channel 454 may be a wired communication channel.

Figure 5:
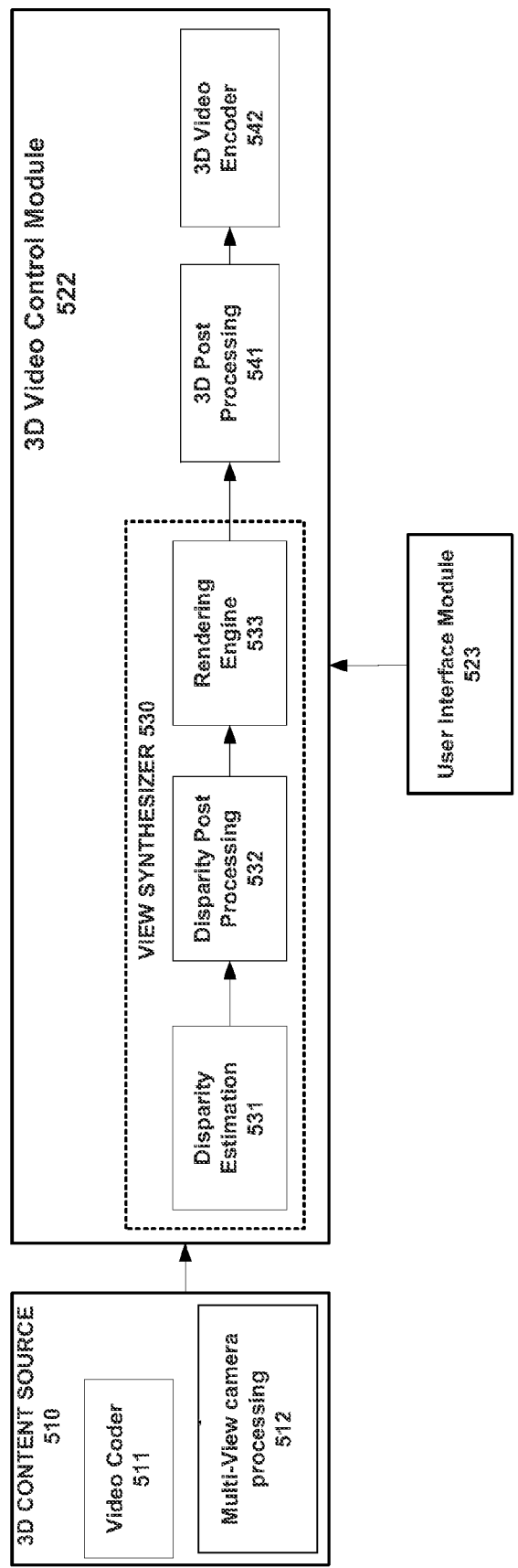
FIG. 5 shows a block diagram illustrating example arrangements of components of a 3D video control module.

FIG. 5 shows a more detailed version of a 3D video control module, such as 3D video control module 422 of FIG. 4. As previously mentioned, however, either all or part of the functionality of 3D video control module 522 might be distributed between a source device, a destination device, or a third-party device. 3D video control module 522 receives 3D video content from a 3D video content source 510. The 3D video content may be received from a local source such as device memory or may be received externally such as via a wireless or wired connection with an external video source. 3D content source 510 may include a video coder 511 to either encode or decode the 3D video content prior to transmitting the 3D video content to 3D video control module 522. The example 3D content source 510 includes a multi-view camera processing block 512 configured to capture and process multiple views of the same scene. In alternative configurations, the content of 3D content source may be computer-generated for specific applications, such as gaming. In general, 3D content source 510 can provide all of the same types of image data discussed above in relation to image source 22 of FIG. 1.

3D video control module 522 includes a view synthesizer 530 configured to render a synthesized 3D image based on the received 3D content. View synthesizer 530 includes a disparity estimation module 531 configured to estimate the disparity between any pair of images acquired with a stereo setup to produce a disparity map. Disparity estimation module 531 may be functionally similar to disparity processing unit 24 described in relation to FIGS. 1 and 2 above. View synthesizer 530 further includes a disparity post-processing module 532 configured to modify the disparity map produced by disparity estimation module 531 according to user preference data received from 3D user interface module 523. View synthesizer 530 further includes a rendering engine 533 configured to render a 3D image based on the disparity information and the user preferences.

3D user interface module 523 can send to 3D video control module 522 user preference data. In one example, the user preference data specifies which of the right and left image to use in rendering 3D content. If for example, the 3D user preference data specifies the left image, then rendering engine 533 can render 3D content based on the original left image and the disparity map, whereas if the 3D user preference data specifies the right image, then rendering engine 533 can render 3D content based on the original right image and the disparity map. Certain viewers tend to rely on their right eye for processing certain types of positional information, while other people tend to rely on their left eye. Based on which eye a particular person relies on most heavily, i.e. which eye is their dominant eye, may affect how they visualize 3D content. Therefore, aspects of this disclosure include a system for allowing users to specify which of the left and right images to use for rendering, so that a user can determine which image, left or right, produces the 3D content they prefer.

In another example, 3D user interface module 523 can send user preference data to 3D video control module 522 that contains a new depth range or that contains a modification to the current depth range. The depth range specifies a maximum depth in front of the screen and a maximum depth behind the screen for which image data can be rendered. For a first example, as measured in millimeters, a current depth range might be 1200 with a maximum depth of 200 in front of the screen and 1000 behind the screen, or in a second example, the current depth range might be 1200 with a maximum depth of 600 in front of the screen and 600 behind the screen. In response to receiving from 3D user interface module 523 user preference data containing a modification to the depth range, 3D video control module 522 might reduce the depth range by an amount, such as 10%. If the user preference data does not specify a preference for a larger reduction either in front of the screen or behind the screen, then to reduce the depth range, 3D video control module 522 can reduce the depth range by 10% in front of the screen and 10% behind the screen, such that the new total depth range for the first example would be 1080 allocated 140 in front of the screen and 940 behind the screen. For the second example, the new total depth range would also be 1080 but allocated 540 in front of the screen and 540 behind the screen.

In some implementations, a user may be able to specify a reduction or increase to only the portion of the depth range allocated in front of the screen or only the portion allocated behind the screen. For example, if user preference data specifies a reduction of 10% to the portion of the depth range allocated in front of the screen, then in the first example the new total depth range would be adjusted to 1180 allocated 180 in front of the screen and 100 behind the screen, or in the second example, would be adjusted to 1140 allocated 540 in front of the screen and 600 behind the screen. Modifying only the portion of the depth range allocated in front of the screen may, for example, be one way to adjust the amount of pop-out effect a user experiences. As will be described later, this disclosure also contemplates other techniques for adjusting the amount of pop-out effect a user experiences.

To modify the depth range of 3D content, disparity estimation module 531 can linearly project each depth value in a depth map to a new depth value to create a modified depth map. Based on the new depth map, a new disparity map can be generated, and based on the new disparity map, rendering engine 533 can generate 3D content in accordance with user preferences. Increasing or decreasing the depth range may improve how a viewer perceives rendered 3D content and may also improve viewer comfort, due to reduced eye strain for example.

In another example, 3D user interface module 523 can send user preference data to 3D video control module 522 to change the depth distribution mode. For example, 3D user interface module 523 can send user preference data that contains a non-uniform new depth range or non-uniform modification to the current depth range in order to create a concave or convex effect. For example, having depth ranges decrease for pixels further away from the center of the image can produce a concave effect, while having depth ranges increase for pixels farther away from the center can create a convex effect. To create a convex or concave effect, depth ranges are altered in the manner described above, but the depth range for each pixel might be different. For example, to create a convex effect, center pixels might have a depth range of 1200 while border pixels have a depth range of 1000. Pixels between the center and border can have a depth range between 1000 and 1200 depending on their distance from the center of the image. Conversely, to create a concave effect, the pixels at the center of an image might have a depth of 1000 while pixels at the border of an image have a depth of 1200.

In another example, 3D user interface module 523 can send to 3D video control module 522 user preference data that contains either a new baseline or a new amount of pop-out effect or a modification to the current baseline or amount of pop-out effect. Upon receiving the user preference data, disparity post processing module 532 can modify the disparity map in accordance with the following equation:

$$d_{synth} = b_d f\left(\frac{1}{Z_c} - \frac{1}{Z}\right) \quad (2)$$

where, $d_{synth}$ is the modified disparity value for the pixel; $b_d$ is the baseline, i.e. the separation between the two camera centers, in units of pixels; $Z_c$ is the distance from the camera to the convergence plane; Z is the depth of the pixel from the camera; and f is the focal length of the camera. In response to receiving user preference data indicating the amount of pop-out effect is to be increased, disparity post processing module 532 can lower the value of $Z_c$ and determine a new disparity value for each pixel based on the new $Z_c$ value. In response to receiving user preference data indicating the amount of pop-out effect be reduced, disparity post processing module 532 can increase the value of $Z_c$ and determine a new disparity value for each pixel based on the new $Z_c$ value. Based on the modified disparity map, rendering engine 533 can render 3D content in accordance with the user's preferences. Increasing or decreasing the amount of pop-out effect may improve how a viewer perceives rendered 3D content and may also improve viewer comfort, due to reduced eye strain for example.

Based on equation 1, disparity post processing unit 532 can also adjust the baseline. In response to receiving user preference data indicating the baseline be decreased, disparity post processing module 532 can lower the value of $b_d$ and determine a new disparity value for each pixel based on the new $b_d$ value. In response to receiving user preference data indicating the baseline be increased, disparity post processing module 532 can increase the value of $b_d$ and determine a new disparity value for each pixel based on the new $b_d$ value. Based on the modified disparity map, rendering engine 533 can render 3D content in accordance with the user's preferences. Different viewers have different amounts of separation between their eyes, and therefore, different viewers may prefer a different baseline for rendered 3D content.

3D video control module 522 further includes a 3D post-processing block 541 configured to modify the synthesized image according to other user preference data or according to the wireless channel capabilities. As an example of other user preference data, 3D user interface module 523 can send to 3D video control module 522 user preference data that sharpens or smooths various portions of 3D content, based on depth values of the 3D content. 3D post-processing block 541 can, for example, sharpen or smooth an image or portions of an image by using an edge detection technique, such as high pass filtering, to identify object transitions in the image and modify pixel values, such as chroma and luma values, at pixels identified as corresponding to the object transitions. For example, to emphasize certain object transitions, the difference between pixel values at identified object transition can be increased (i.e. sharpened) or can be reduced (i.e. smoothed). In some implementation, 3D post-processing block 541 can perform depth-based sharpening or depth-based smoothing, where the modification to a pixel value can be a function of a depth value of the pixel. Depth-based sharpening and depth-based smoothing may be used by a user, for example, to sharpen only images in front of the screen or to smooth only images behind the screen. Depth-based sharpening and depth-based smoothing may improve a viewer experience by allowing the viewer to emphasize objects, through sharpening, at certain depths, or to deemphasize, through smoothing, objects at certain depths.

For example, the synthesized image can be smoothed (low-pass filtered) or reduced in resolution in order to require lower bit rate when compressed for wireless transmission. This is based on the fact that the HVS is tolerant to errors in one of the images, especially if this image is the one visualized with the non-dominant eye. 3D Video control module 522 further includes a 3D video encoder 542 configured to encode the two or more views to generate a combined image containing information of all the views. 3D video encoder 542 may encode the combined image, for example, based on the H.264/AVC—Amendment 1: Multiview Video Coding (MVC) or the H.264/AVC for a combined image containing information of all the views. The combined image can be obtained using a side-by-side configuration of the original and the post-processed synthesized views or any interleaved configuration. The combined image may keep the original resolution for all the views or reduce the resolution for any number of the synthesized views.

Figure 6:
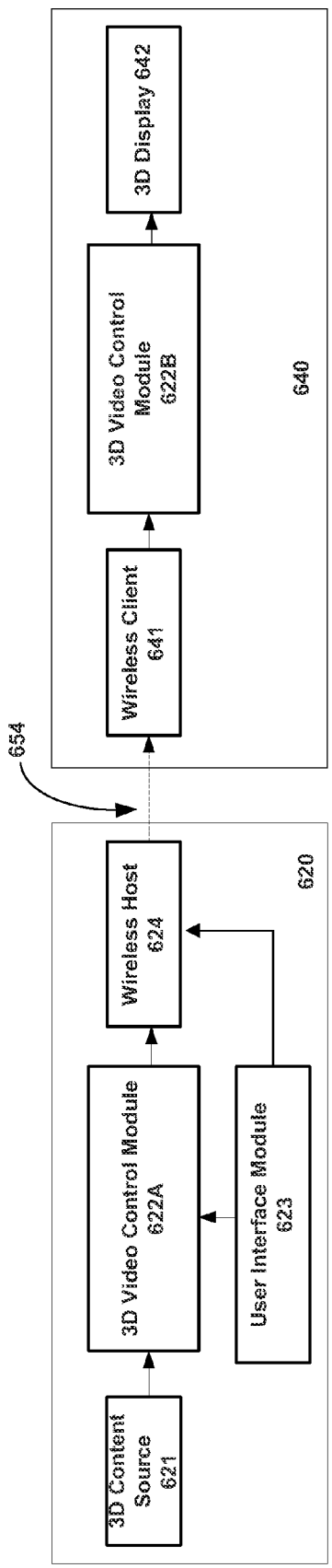
FIG. 6 shows a block diagram of an example system configured to adjust perceived 3D effects based on user preferences, in accordance with an example of the present disclosure.

FIG. 6 shows an example system configured to adjust perceived 3D effects based on user preference data, in accordance with the present disclosure. The system of FIG. 6 is similar to the system of FIG. 4, but while 3D video control module 422 is shown in FIG. 4 as being entirely within device 420, functionality equivalent to 3D video control module 422 is distributed between 3D video control module 622A in device 620 and 3D video control module 622B of device 640. In the example system shown in FIG. 6 the components of device 620 might be in a device such as source device 20 of FIG. 1 while the components of device 640 might be in a device such as destination device 40 of FIG. 1. The system of FIG. 6 includes a 3D content source 621 that provides 3D content (in particular, stereo content) to a 3D video control module 622A. This content can be stored locally as a file, streamed from a source external to the device, or be provided by a multi-view image/video camera embedded in the device.

FIG. 6 further includes a 3D user interface module 623 configured to capture and process the input of users. The capture can be based on any haptic, visual or audio means. The result of processing the input command is communicated as user preference data to 3D video control module 622A. Based on the user preference data, 3D video control module 622A can adjust 3D viewing preferences either during the initialization of a viewing session or while the content is being displayed. 3D video control module 622A can process the user preference data from 3D user interface module 623 in real time.

The example system of FIG. 6 further includes a wireless host 624 configured to interface with the components of device 640 via a wireless channel 654. Wireless host 624 receives 3D content from the 3D video control module 622A and transmits the 3D content to a wireless client 641 of device 640 according to a transport protocol, such as WiFi or another transport protocol. In one particular embodiment, the user preference data can also be transmitted with 3D content and processed by a 3D video control module at device 640.

A 3D display 642 at device 640 can receive the 3D content through wireless client 641. Wireless client 641 may be embedded in 3D display 642 or external to 3D display 642 and connected through an interface, such as an HDMI or Display Port interface. In one particular aspect, certain functionality of 3D video control module 622B may also be embedded in 3D display 642.

In the example of FIG. 6, where the functionality of the 3D video control module 622A&B is split between device 620 and 640, the user preference data received from under interface module 623 can be transmitted from the device containing device 620 to the device containing device 640. In such a configuration, the device containing device 620 behaves as a remote control for the adjustment of 3D-effects of the display based on user-preference data. The transmission channel can be any of the wireless radios available such as Bluetooth or Wi-Fi. The transfer of the user preference data can be in-band with the transmission channel used for the 3D content or on a separate band. The 3D-user preferences data can be set up before the 3D content is streamed to the display or while it is being streamed.

In the example of FIG. 6, 3D video control module 622A can include a disparity estimation module and 3D video encoder, similar to disparity estimation module 531 and 3D video encoder 542 described in reference to FIG. 5. The video encoder of 3D video control module 622A can encode and transmit, for example, an original image and a disparity map, according to a known coding standard. The video encoder of 3D video control module 622A can also encode and transmit the user-preference data received from user interface module 623.

In the example of FIG. 6, 3D video control module 622B can include a disparity post processing module, rendering engine, and 3D post processing block, similar to disparity post processing module 532, rendering engine 533, and 3D post processing block 541 described in reference to FIG. 5. Based on the original image, disparity map, and user-preference data, the disparity post processing module, rendering engine, and 3D post processing block can generate 3D images in the same manner described above in relation to FIGS. 1, 2, and 5. The user preference data and adjustments to video rendering based on the user preference data described above in relation to FIG. 5 can also be performed by the system of FIG. 6. For example, the modifications to the dominant eye selection, depth range, depth distribution mode, baseline, amount of pop-out effect, and degree of sharpness discussed above in relation to 3D video control module 522 of FIG. 5 can also be performed by 3D video control module 622B of FIG. 6.

In one example system, the functionality of device 620 can be contained within a cellular phone, smartphone, notebook computer, tablet computer, or any wireless devices that can communicate picture and/or video information over a communication channel. The functionality of device 640 can be contained either within a 3D-enabled television or within a set-top box connected to a 3D-enabled television. Additionally, although the example of FIG. 6 is described with a wireless communication channel, it is contemplated that a wired communication channel could also be used for communication channel 654.

In one example, using a RTSP network control protocol the 3D user preference data can be part of a request with a SETUP/SET-PARAMETER method that can be updated at any time. In another example, using the SOAP (Simple Access Object Protocol) and the HTTP application protocol, the 3D user preferences can be updated by means of an action command, which updates an argument of a services described in the device description, where the device is a 3D display with functionalities of 3D video control module 622B.

Figure 7:
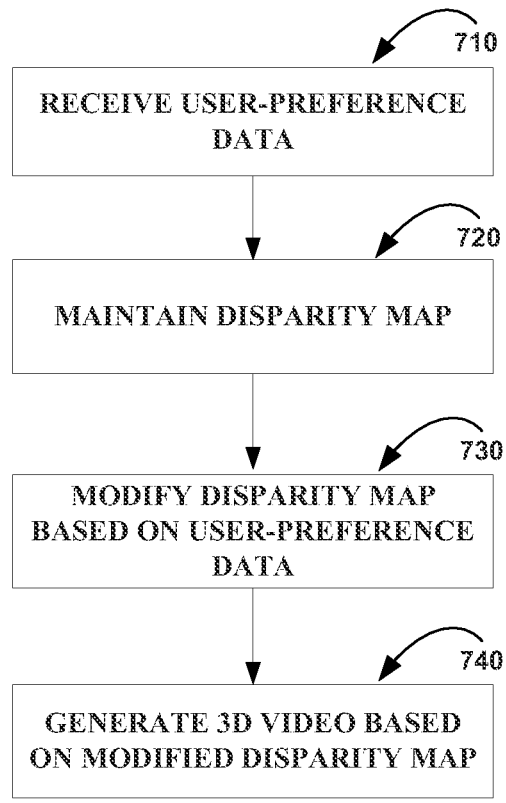
FIG. 7 shows a flow diagram illustrating example aspects of the present disclosure.

FIG. 7 shows a flow diagram of a method embodying aspects of the present disclosure. The method will be described with reference to FIGS. 1-6. At a 3d video control module, such as 3d video control modules 422, 522, or 622A, user preference data for presentation of 3D image content is received (710). At a disparity estimation module, such as disparity estimation module 531 or disparity processing unit 24, a disparity map based on disparity values associated with the 3D image content can be generated, stored, and updated (720). A disparity post processing module, such as disparity post processing module 532, modifies the disparity map based on the user preference data (730). A rendering engine, such as 3D rendering engine 533, generates 3D video based on the modified disparity map (740).

Figure 8:
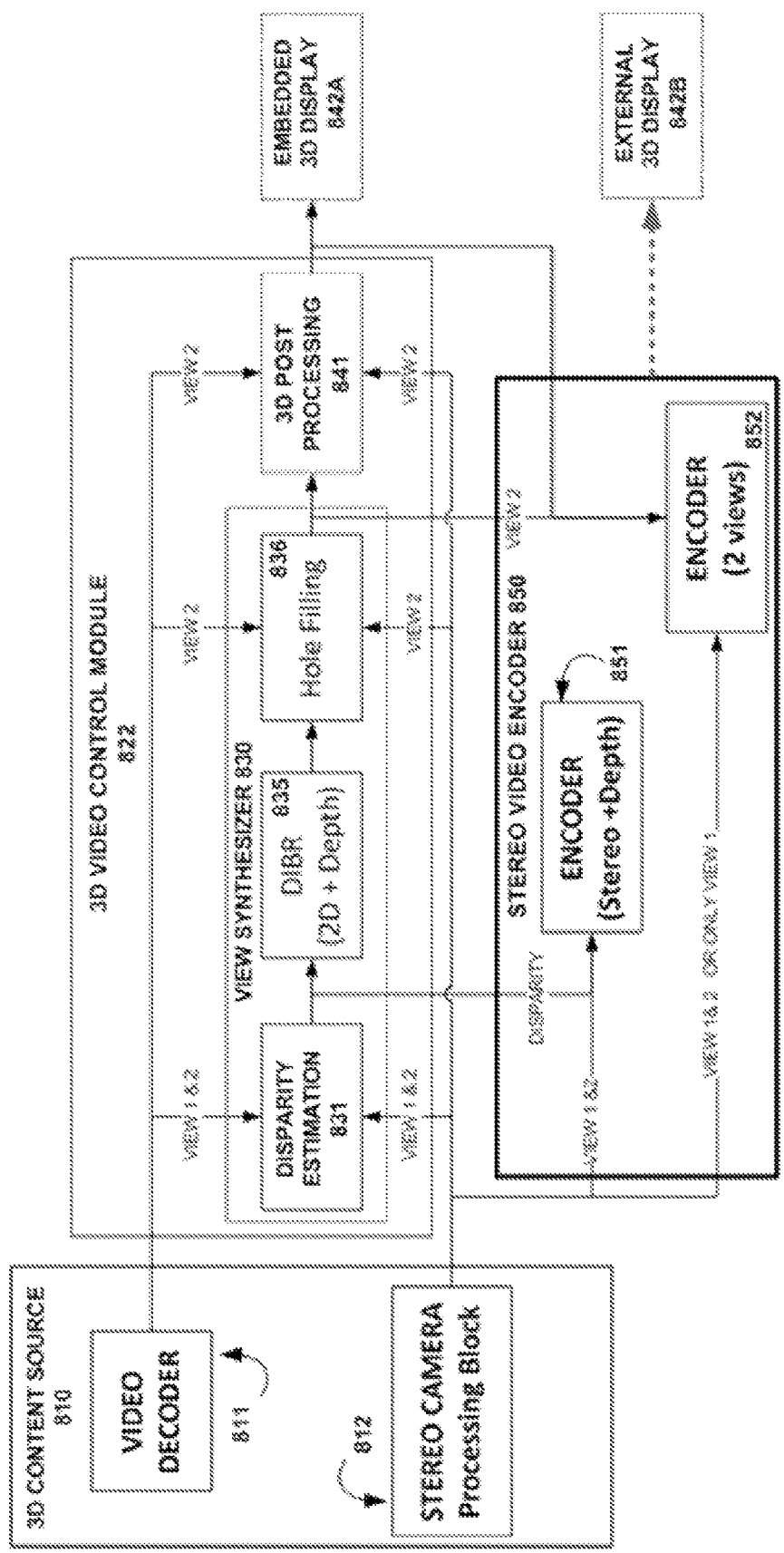
FIG. 8 shows a block diagram of an example system configured to render 3D video in accordance with an example of the present disclosure.

FIG. 8 shows an example system configured to adjust perceived 3D effects based on user preference data, in accordance with the present disclosure. The system of FIG. 8 includes a 3D content source 810 that provides 3D content (in particular, stereo content) to a 3D video control module 822. This 3D content can be stored locally as a file, streamed from a source external to the device, or can be provided by a multi-view image/video camera embedded in the device. For locally stored files or video streamed from an external source, 3D content source 810 may include a video decoder 811 to decode the 3D content prior to the 3D content being transmitted to a 3D video control module 822. For multi-view image/video data acquired from an embedded 3D camera, 3D content source 812 may include a stereo camera processing block 812 for processing the acquired 3D content prior to the acquired 3D content being transmitted to 3D video control module 822. Whether from video decoder 811 or stereo camera processing block 812, the 3D content transmitted to 3D video control module 822 will generally be in the form of a stereo pair of images (view 1 and view 2). 3D video control module 822 generates a synthesized 3D image based on the stereo pair of images.

3D video control module 822 includes a view synthesizer 830 configured to render a synthesized 3D image based on the received 3D content (view 1 and view 2). View synthesizer 830 includes a disparity estimation module 831 configured to determine a disparity map based on view 1 and view 2. Disparity estimation module 831 may be functionally similar to disparity processing unit 24 described in relation to FIGS. 1 and 2 above. View synthesizer 830 further includes a depth image based rendering (DIBR) engine 833 configured to render a synthesized 3D image based on depth information obtained from the disparity information and one or both of view 1 and view 2. View synthesizer 830 further includes a hole filling module 836 configured to refine the 3D image produced by DIBR 835. The refinements performed by hole filling module 836 can detect and correct artifacts in the synthesized 3D images. The artifacts may, for example, be the result of errors in the disparity estimation performed by disparity estimation module 831 or errors in the rendering performed by DIBR 836.

3D video control module 822 further includes a 3D post-processing block 841 configured to modify the synthesized 3D image. For example, the synthesized image can be smoothed (low-pass filtered) or reduced in resolution in order to require lower bit rate when compressed for wireless transmission. As described in more detail above, 3D video control module 822 can be configured to modify the received 3D content and/or synthesized 3D image based on user preference data. The user preference data and adjustments to video rendering based on the user preference data described above in relation to FIG. 5 can also be performed by the system of FIG. 8. For example, the modifications to the dominant eye selection, depth range, depth distribution mode, baseline, amount of pop-out effect, and degree of sharpness discussed above in relation to 3D video control module 522 of FIG. 5 can also be performed by 3D video control module 822 of FIG. 8.

The synthesized 3D image can be displayed on an embedded 3D display 842A, or alternatively, the synthesized 3D image can be encoded by stereo video encoder 850 for transmission to an external 3D display 842B. Stereo video encoder 850 can include multiple encoding modules. For example, a first encoder module 851 can be configured to encode both view 1 and view 2 along with depth information for transmission to external 3D display device 842B, or to encode disparity information and only of view 1 or view 2. A second encoder module may be configured to encode only view 1 and view 2 or an original version of view 1 and a modified version of view 2, for example. The second encoder module 852 may alternatively encode the synthesized 3D image output by view synthesizer 830 or the synthesized 3D image output by 3D post processing block 841.

3D video control module 822 further includes a 3D post-processing block 841 configured to modify the synthesized image according to other user preferences or according to the wireless channel capabilities. For example, the synthesized image can be smoothed (low-pass filtered) or reduced in resolution in order to require a lower bit rate when compressed for wireless transmission. 3D Video control module 522 further includes a 3D video encoder 542 configured to encode the two or more views to generate a combined image containing information of all the views. 3D video encoder 542 may encode the combined image, for example, based on the H.264/AVC—Amendment 1: Multiview Video Coding (MVC) or the H.264/AVC for a combined image containing information of all the views. The combined image can be obtained using a side-by-side configuration of the original and the post-processed synthesized views or any interleaved configuration. The combined image may keep the original resolution for all the views or reduce the resolution for any number of the synthesized views. The modules, units, blocks, and other components described in FIGS. 1, 2, 4, 5, 6, and 8 may be implemented as hardware, software, firmware, or any combination thereof.

The techniques described herein may be implemented in hardware, software, firmware, or any combination thereof. For example, various aspects of the techniques may be implemented within one or more microprocessors, DSPs, ASICs, FPGAs, or any other equivalent integrated or discrete logic circuitry, as well as any combinations of such components, embodied in encoders, laptop, desktop or handheld computers, wireless mobile handsets, set-top boxes, or other devices. The term "processor" or "processing circuitry" may generally refer to any of the foregoing logic circuitry, alone or in combination with other logic circuitry, or any other equivalent circuitry.

Any features described as modules or components may be implemented together in an integrated logic device or separately as discrete but interoperable logic devices. If implemented in software, the techniques may be realized at least in part by a non-transitory, computer-readable data storage medium comprising program code including instructions that, when executed, performs one or more of the methods described in this disclosure. The non-transitory, computer-readable data storage medium may form part of a computer program product. The non-transitory, computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a non-transitory, computer-readable communication medium that carries or communicates program code in the form of instructions or data structures and that can be accessed, read, and/or executed by a computer. The term "non-transitory" may indicate that the storage medium is not embodied in a carrier wave or a propagated signal. However, the term "non-transitory" should not be interpreted to mean that storage medium is non-movable. As one example, a storage medium may be removed from a device and moved to another device. As another example, a storage medium may be inserted into a device. In certain examples, a non-transitory storage medium may store data that can, over time, change (e.g., in RAM).

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

The invention claimed is:

1. A system comprising:
   a user interface module configured to receive user preference data for presentation of 3D image content, the user preference data comprising a user-entered value for selecting a dominant-eye parameter indicating either a left eye or a right eye is dominant;
   a disparity estimation module configured to maintain a disparity map based on disparity values associated with the 3D image content;
   a disparity processing module configured to generate a modified disparity map by modifying the disparity map based on the user preference data;
   a rendering module configured to generate 3D image content including an original image and a synthesized image based on the modified disparity map, wherein the synthesized image is rendered on the left of the original image when the dominant-eye parameter indicates the right eye is dominant, and the synthesized image is rendered on the right of the original image when the dominant-eye parameter indicates the left eye is dominant; and
   a processor that implements or controls the user interface module, the disparity estimation module, the disparity processing module, and the rendering module.

2. The system of claim 1, wherein the user preference data further comprises a user-entered value indicating a modification to a pop-out effect parameter.

3. The system of claim 1, wherein the user preference data further comprises a user-entered value for modifying a baseline parameter.

4. The system of claim 1, wherein the user preference data further comprises a user-entered value for modifying a depth range parameter.

5. The system of claim 1, wherein the user preference data further comprises a user-entered value for modifying a degree-of-sharpness parameter.

6. The system of claim 1, wherein the user preference data further comprises a user-entered value for selecting a depth-distribution parameter.

7. The system of claim 1, wherein the disparity processing module is configured to receive the user preference data from the user interface module via wireless communication.

8. The system of claim 1, further comprising:
   a transmitter configured to transmit the user preference data from a source device comprising the user interface module to a destination device comprising the rendering module.

9. The system of claim 1, further comprising:
   a transmitter configured to transmit the modified disparity map from a source device comprising the user interface module to a destination device comprising the rendering module.

10. A method comprising:
    receiving, at a hardware device, user preference data for presentation of 3D image content, the user preference data comprising a user-entered value for selecting a dominant-eye parameter indicating either a left eye or a right eye is dominant;
    storing, at a hardware device, a disparity map based on disparity values associated with the 3D image content;
    modifying, at a hardware device, the disparity map based on the user preference data; and
    generating, at a hardware device, 3D image content including an original image and a synthesized image based on the modified disparity map, wherein the synthesized image is rendered on the left of the original image when the dominant-eye parameter indicates the right eye is dominant, and the synthesized image is rendered on the right of the original image when the dominant-eye parameter indicates the left eye is dominant.

11. The method of claim 10, wherein the user preference data further comprises a user-entered value for modifying a pop-out effect parameter.

12. The method of claim 10, wherein the user preference data further comprises a user-entered value for modifying a baseline parameter.

13. The method of claim 10, wherein the user preference data further comprises a user-entered value for modifying a depth range parameter.

14. The method of claim 10, wherein the user preference data further comprises a user-entered value for modifying a degree-of-sharpness parameter.

15. The method of claim 10, wherein the user preference data further comprises a user-entered value for selecting a depth-distribution parameter.

16. The method of claim 10, wherein the disparity processing module is configured to receive the user preference data from the user interface module via wireless communication.

17. The method of claim 10, wherein the receiving is performed by a source device and the generating is performed by a destination device.

18. The method of claim 10, further comprising:
transmitting the user preference data from a source hardware device performing the receiving to a destination hardware device performing the rendering.

19. The method of claim 10, further comprising:
transmitting the modified disparity map from a source hardware device performing the receiving to a destination hardware device performing the rendering.

20. An apparatus comprising:
means for receiving user preference data for presentation of 3D image content, the user preference data comprising a user-entered value for selecting a dominant-eye parameter indicating either a left eye or a right eye is dominant;
means for storing a disparity map based on disparity values associated with the 3D image content;
means for modifying the disparity map based on the user preference data; and
means for generating 3D image content including an original image and a synthesized image based on the modified disparity map, wherein the synthesized image is rendered on the left of the original image when the dominant-eye parameter indicates the right eye is dominant, and the synthesized image is rendered on the right of the original image when the dominant-eye parameter indicates the left eye is dominant.

21. The apparatus of claim 20, wherein the user preference data further comprises a user-entered value for modifying a pop-out effect parameter.

22. The apparatus of claim 20, wherein the user preference data further comprises a user-entered value for modifying a baseline parameter.

23. The apparatus of claim 20, wherein the user preference data further comprises a user-entered value for modifying a depth range parameter.

24. The apparatus of claim 20, wherein the user preference data further comprises a user-entered value for modifying a degree-of-sharpness parameter.

25. The apparatus of claim 20, wherein the user preference data further comprises a user-entered value for selecting a depth-distribution parameter.

26. The apparatus of claim 20, wherein the disparity processing module is configured to receive the user preference data from the user interface module via wireless communication.

27. The apparatus of claim 20, further comprising:
means for transmitting the user preference data from a source device comprising the means for receiving to a destination device comprising the means for rendering.

28. The apparatus of claim 20, further comprising:
means for transmitting the modified disparity map from a source device comprising the means for receiving to a destination device comprising the means for rendering.

29. A non-transitory computer readable storage medium tangibly storing one or more instructions, which when executed by one or more processors cause the one or more processors to:
receive user preference data for presentation of 3D image content, the user preference data comprising a user-entered value for selecting a dominant-eye parameter indicating either a left eye or a right eye is dominant;
store a disparity map based on disparity values associated with the 3D image content;
modify the disparity map based on the user preference data; and
generate 3D image content including an original image and a synthesized image based on the modified disparity map, wherein the synthesized image is rendered on the left of the original image when the dominant-eye parameter indicates the right eye is dominant, and the synthesized image is rendered on the right of the original image when the dominant-eye parameter indicates the left eye is dominant.

30. The non-transitory computer readable storage medium of claim 29, wherein the user preference data further comprises a user-entered value for modifying a pop-out effect parameter.

31. The non-transitory computer readable storage medium of claim 29, wherein the user preference data further comprises a user-entered value for modifying a baseline parameter.

32. The non-transitory computer readable storage medium of claim 29, wherein the user preference data further comprises a user-entered value for modifying a depth range parameter.

33. The non-transitory computer readable storage medium of claim 29, wherein the user preference data further comprises a user-entered value for modifying a degree-of-sharpness parameter.

34. The non-transitory computer readable storage medium of claim 29, wherein the user preference data further comprises a user-entered value for selecting a depth-distribution parameter.

35. The non-transitory computer readable storage medium of claim 29, wherein the disparity processing module is configured to receive the user preference data from the user interface module via wireless communication.

36. The non-transitory computer readable storage medium of claim 29, wherein the receiving is performed by a source device and the generating is performed by a destination device.

37. The non-transitory computer readable storage medium of claim 29, storing one or more additional instructions, which when executed by the one or more processors cause the one or more processors to:
transmit the user preference data from a source device performing the receiving to a destination device performing the rendering.

38. The non-transitory computer readable storage medium of claim 29, storing one or more additional instructions, which when executed by the one or more processors cause the one or more processors to:
transmit the modified disparity map from a source device performing the receiving to a destination device performing the rendering.

* * * * *